US010791378B2

United States Patent
Strein et al.

(10) Patent No.: US 10,791,378 B2
(45) Date of Patent: Sep. 29, 2020

(54) TECHNIQUES FOR OPTIMIZING VIDEO CONTENT BASED ON REDUNDANT INTERNET PROTOCOL ADDRESSES

(71) Applicant: Disney Enterprises, Inc., Burbank, CA (US)

(72) Inventors: Michael Strein, New York, NY (US); Efthimis Stefanidis, Douglaston, NY (US); Vladislav Feldman, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/494,404

(22) Filed: Apr. 21, 2017

(65) Prior Publication Data
US 2018/0310072 A1  Oct. 25, 2018

(51) Int. Cl.
| H04N 7/173 | (2011.01) |
| H04N 21/61 | (2011.01) |
| H04N 21/2665 | (2011.01) |
| H04N 21/643 | (2011.01) |
| H04N 21/2187 | (2011.01) |

(52) U.S. Cl.
CPC ..... *H04N 21/6143* (2013.01); *H04N 21/2187* (2013.01); *H04N 21/2665* (2013.01); *H04N 21/64322* (2013.01)

(58) Field of Classification Search
CPC ............ H04N 21/632; H04N 21/2225; H04N 21/23106; H04L 67/104
See application file for complete search history.

(56) References Cited

U.S. PATENT DOCUMENTS

| 2003/0121053 A1* | 6/2003 | Honda ...................... H04L 1/24 725/107 |
| 2010/0011103 A1* | 1/2010 | Luzzatti ............ H04L 29/06027 709/226 |
| 2010/0146040 A1* | 6/2010 | Ramakrishnan ... H04N 7/17318 709/203 |
| 2011/0302248 A1* | 12/2011 | Garrett ................... G06Q 20/10 709/205 |
| 2013/0031211 A1* | 1/2013 | Johnson ........... H04N 21/23103 709/218 |
| 2017/0188114 A1* | 6/2017 | Bibayoff ............ H04N 21/6547 |

* cited by examiner

*Primary Examiner* — Jason Salce
(74) *Attorney, Agent, or Firm* — Artegis Law Group, LLP

(57) ABSTRACT

In one embodiment, a change over application distributes video content received from multiple origination sources. The change over application computes a first score based on a portion of first origination video content received from a first origination source, where the first origination source is associated with a first IP address. The change over application then determines a second origination source of second origination video content based on the first score and a selection criterion, where the second origination source is associated with a second IP address. Subsequently, the change over application transmits portions of the second origination video content received from the second origination source to the destination as portions of the distribution video content. Advantageously, unlike previous approaches to optimizing distribution video content, because a processor executes the change over application, dedicated hardware is not required.

20 Claims, 3 Drawing Sheets

TECHNIQUES FOR OPTIMIZING VIDEO CONTENT BASED ON REDUNDANT INTERNET PROTOCOL ADDRESSES

BACKGROUND OF THE INVENTION

Field of the Invention

Embodiments of the present invention relate generally to computer processing and, more specifically, to techniques for optimizing video content based on redundant internet protocol addresses.

Description of the Related Art

Ensuring the quality of "origination" video content that is delivered to different destinations as "distribution" video content is a primary goal of many video distributors. However, origination video content may be corrupted due to a variety of causes, including transmission errors, playback errors, and signal interference, to name a few. Accordingly, many video distributors implement an "air and protect" model to provide high-quality distribution video content to relevant target destinations. In the air and protect model, multiple origination sources of ostensibly identical origination video content are identified. A distribution source is selected from the origination sources, and portions of the origination video content received from the selected distribution source are transmitted to the target destinations. If portions of the origination video content received from the distribution source are corrupted, then a new distribution source is selected from the origination sources. Subsequently, portions of the origination video content received from the new distribution source are transmitted to the target destinations. This process of changing the distribution source from one origination source to a different origination source is commonly referred to as a "change over process."

A typical change over process involves a video server and a dedicated hardware unit referred to herein as a "change over box." As also referred to herein, a "video server" may be any device that is configured to process and deliver video content. In operation, the video server transmits portions of the origination video content received from the different origination sources, including the currently designated distribution source, to the change over box. As the change over box receives the portions of the origination video content, the change over box determines scores for the different origination sources. For example, for each of the different origination sources, the change over box could determine an error rate for the portions of origination video content received from the origination source over an interval of one second. If the change over box determines that the score of the currently designated distribution source is unacceptable, then the change over box selects a different origination source as a new distribution source based on the scores. The change over box then configures the video server to transmit portions of the origination video content received from the new distribution source to the relevant target destinations.

One drawback of implementing a change over process via a change over box is that maintaining distribution video content of acceptable quality typically requires the change over box to be located relatively close to the video server. More specifically, as the distance between the video server and the change over box increases, there is an increased likelihood that portions of origination video content transmitted from the video server to the change over box are going to become corrupted during transmission. Notably, the change over box cannot determine whether corrupted portions of video content were already corrupted when received at the video server itself or became corrupted during transmission from the video server to the change over box. Consequently, the change over box ends up selecting distribution sources based on scores that may not accurately reflect the quality of the portions of origination video content received at the video server. In addition, as the distance between the video server and the change over box increases, the resource demands required to maintain the transmission paths between the video server and the change over box increase.

Installing a change over box relatively close to the video server may be acceptable when the hardware resources that implement the video server are physically located in a data center that is owned by the video distributor. However, installing a change over box relatively close to the video server may be highly impractical, if not impossible, when the hardware devices that implement the video server are physically located in a data center that is not owned by the video distributor. Notably, the owners of these types of data centers are typically unwilling to install and maintain dedicated hardware units that are not part of the infrastructure of the data center. For example, "Amazon Web Services"™ (AWS™) may not want to install a change over box for a broadcaster in an AWS™ data center that provides a cloud computing environment to customers.

As the foregoing illustrates, what is needed in the art are more effective techniques for managing the distribution of video content received from different origination sources.

SUMMARY OF THE INVENTION

One embodiment of the present invention sets forth a computer-implemented method for distributing video content received from multiple origination sources. The method includes computing a first score based on a portion of first origination video content received from a first origination source that is associated with a first internet protocol (IP) address; identifying a second origination source of second origination video content based on the first score and a selection criterion, where the second origination source is associated with a second IP address; and causing a portion of the second origination video content received from the second origination source to be transmitted to a first destination as a portion of distribution video content.

One advantage of the disclosed techniques is that the techniques allow video distributors to optimize the quality of distribution video content delivered to relevant destinations irrespective of the location of a corresponding video server. By contrast, conventional approaches to generating distribution video content require dedicated hardware to be located relatively close to the corresponding video server to properly optimize distribution video content.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
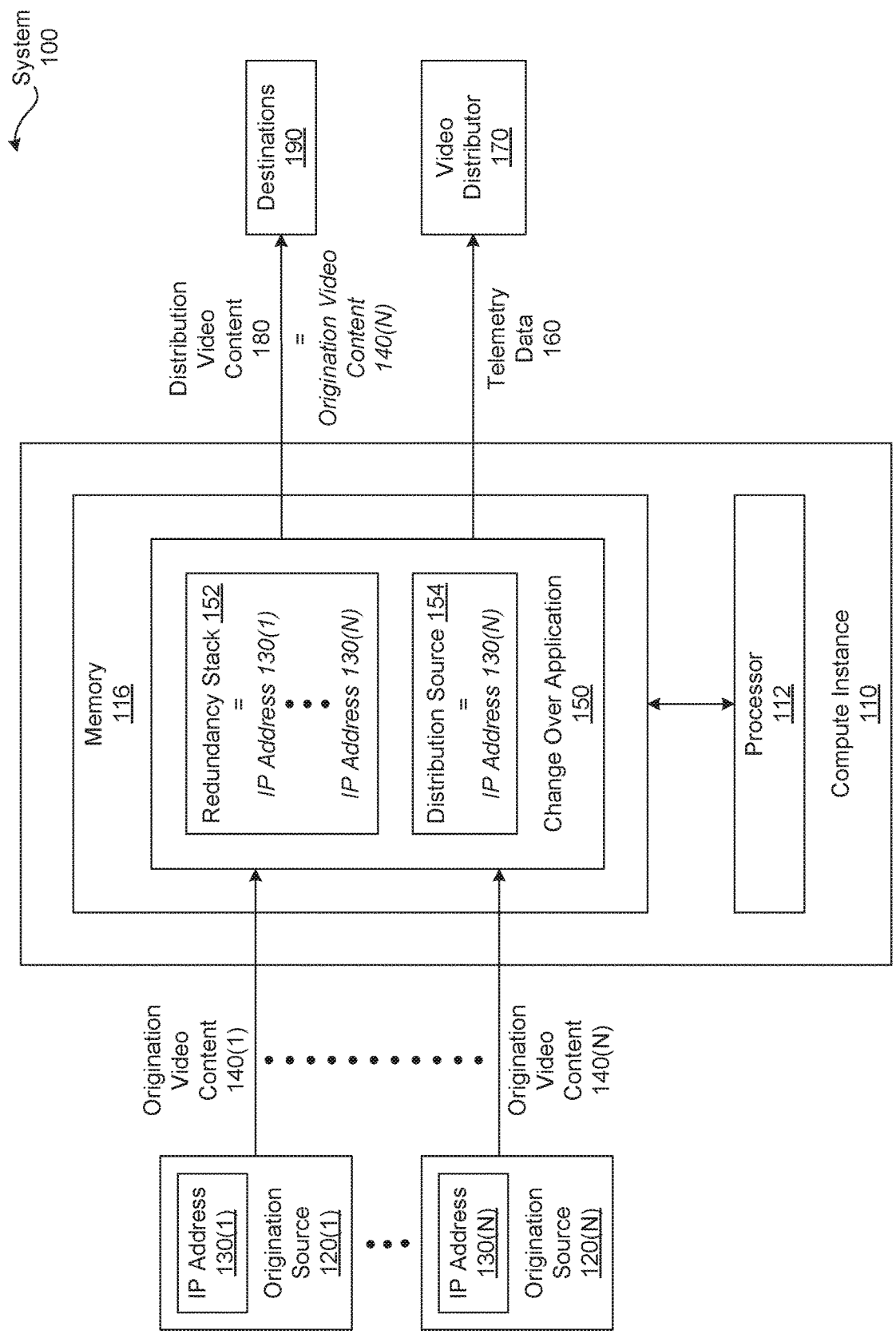
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, any number of origination sources 120, any number of destinations 190, a compute instance 110, and a video distributor 170. For explanatory purposes, multiple instances of like objects are denoted with reference numbers identifying the object and parenthetical numbers identifying the instance where needed.

It will be appreciated that the system 100 shown herein is illustrative and that variations and modifications are possible. In particular, the functionality of the compute instance 110 as described herein may be implemented within or across any number of compute instances 110 and/or other types of dedicated devices (e.g., routers, switches, etc.). Further, the connection topology between the various units in FIG. 1 may be modified as desired.

In general, the system 100 implements an "air and protect" model to provide high-quality distribution video content 180 to the destinations 190. In the air and protect model, each of origination sources 120 provides different, ostensible identical origination video content 140. One of the origination sources 120 is selected, and portions of the origination video content 140 received from the selected origination source 120 are transmitted to the destinations 190 as portions of the distribution video content 180. If portions of the origination video content received from the selected origination source 120 are corrupted, then a different one of the origination sources 120 is selected. Subsequently, portions of the origination video content 140 received from the newly selected origination source 120 are transmitted to the destinations 190 as portions of the distribution video content 180. This process of changing the source of the distribution video content 190 is referred to herein as a "change over process."

A conventional system that implements a change over process typically includes a video server and a dedicated hardware unit referred to herein as a "change over box." As also referred to herein, a "video server" may be any device that is configured to process and deliver video content. In operation, the video server transmits portions of the origination video content received from the different origination sources, including the currently selected origination source, to the change over box. The change over box analyzes the quality of the different origination video content. If the change over box determines that the quality of the origination video content received from the currently selected origination source is unacceptable, then the change over box selects a different origination source. The change over box then configures the video server to transmit portions of the origination video content received from the newly selected origination source to the destinations.

One drawback of implementing a change over process via a change over box is that maintaining distribution video content of acceptable quality typically requires the change over box to be located relatively close to the video server. More specifically, as the distance between the video server and the change over box increases, there is an increased likelihood that portions of origination video content transmitted from the video server to the change over box are going to become corrupted during transmission. As a result, the change over box may end up select an non-optimal origination source.

Optimizing Distribution Video Content

Because installing a dedicated hardware device, such as a change over box, relatively close to a corresponding video server may be highly impractical, if not impossible, the system 100 does not include a change over box. Instead, the system 100 includes a change over application 150 that resides in a memory 116, executes on a processor 112, and implements an optimized change over process based on Internet Protocol (IP) addresses 130. In various embodiments, the system 100 also includes a video server application that executes on the processor 112, thereby configuring the processor 112 as a video server.

As shown, the compute instance 110 includes, without limitation, the memory 116 and the processor 112. In alternate embodiments, the system 100 may include any number of compute instances 110, any number of memories 116, and any number of processors 112 that are implemented in any technically feasible fashion. Further, the compute instance 110, the memory 116, and the processor 112 may be implemented via any number of physical resources located in any number of physical locations. For example, the compute instance 110 could be implemented in a cloud computing environment, a distributed computing environment, a laptop, a switch with processing capability, a router with processing capability, and so forth.

The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112. The memory 116 may be one or more of a readily available memory, such as random access memory (RAM), read only memory (ROM), floppy disk, hard disk, or any other form of digital storage, local or remote.

In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, cloud storage, a Blu-ray Disc, other tangible storage media, or any suitable combination of the foregoing.

As shown, the change over application 150 includes, without limitation, a redundancy stack 152 and a distribution source 154. The redundancy stack 152 includes the IP addresses 130 that specify the origination sources 120 for ostensible (i.e., when no corruption is present) identical origination video content 140. The change over application 150 may determine the redundancy stack 152 in any technically feasible fashion. For example, the change over application 150 could include a graphical user interface (GUI) or application programming interface (API) that enables the video distributor 170 to define the IP addresses 130 that are included in the redundancy stack 152.

Each of the origination sources 120 is a device that is associated with a corresponding IP address 130 and is capable of providing corresponding origination video content 140 to the change over application 150 via an IP network. Each of the origination sources 120 may be associated with the corresponding IP addresses 130 and provide the origination video content 140 using any techniques as known in the art. Further, each of the origination video content 140 may include, without limitation, any type of audio content, video content, text content, and/or any other media content in any combination. Example of origination video content 140 include "real time" content, such as a live satellite feed of a sporting event, or "pre-recorded" content, such as content that is played back from a memory. In general, each of the origination video content 140 may be associated with any type of signal protocol in any technically feasible fashion. For example, each of the origination video content 140 could be associated with a baseband video protocol or an IP streaming video protocol.

As referred to herein, each of the different origination video content 140 and the destination video content 180 includes any number of sequential "portions" of video content, where the extent of each portion may be defined in any technically feasible manner. For instance, in some embodiments, a "portion" of video content may refer to a packet of video content, where each packet comprises a predetermined number of bytes. In other embodiments, a "portion" of video content may refer to a frame, and the video content is associated with a predetermined frame rate (i.e., number of frames that are played per second during playback).

The origination sources 120 may be configured to transmit portions of the different origination video content 140 directly or indirectly to the change over application 150 in any technically feasible fashion. For example, if the computer instance 110 is implemented in a cloud computing environment, then each of the origination sources 120 could transmit portions of a different copy of a live feed directly to the change over application 150 via communication resources included in the cloud computing environment. In another example, the change over application 150 could be implemented in processing functionality that is included in a switch or a router. In these types of implementations, each of the origination sources 120 could transmit portions of a different copy of a live feed to a different input port associated with the switch or the router.

Initially, the change over application 150 may select the origination source 120 in any technically feasible fashion. For example, the change over application 150 could set the IP address 130 that specifies the origination source 120 equal to the first IP address 130 included in the redundancy stack 152. In another example, the change over application 150 could set the IP addresses 130 that specifies the origination source 120 equal to the IP address 130 that specifies a "primary" origination source 120. The change over application 150 could determine the primary origination source 120 in any technically feasible fashion, such as via a GUI or API.

As the change over application 150 receives portions of the origination video content 140(1)-140(N), the change over application 150 computes scores (not shown in FIG. 1) for each of the origination sources 120(1)-120(N). The score of the origination source 120(x) is based on operational metrics (not shown in FIG. 1) and portions of the origination video content 140(x). Subsequently, the change over application 150 compares the scores based any number of selection criteria (not shown in FIG. 1) and sets the distribution source 154 equal to the origination source 120 that is associated with the optimal score. More precisely, the change over application 150 sets the IP address 130 that specifies the distribution source 154 equal to the IP address 130 associated with origination source 120 that is associated with the optimal score.

As part of computing the scores and selecting the distribution source 154, the change over application 150 generates telemetry data 160 and transmits the telemetry data 160 to the video distributor 170. The telemetry data 160 may include any amount and type of data related to the distribution video content 180 and the origination video content 140(1)-140(N), in any combination. For example, the telemetry data 160 could indicate that the origination video content 140(1) is associated with an unacceptable large number of dropped packets and, consequently, the change over application 150 is changing the distribution source 154 from the origination source 120(1) to the origination source 120(N).

The change over application 150 causes portions of the origination video content 140 received from the distribution source 154 to be transmitted to the destinations 190 as portions of the distribution video content 180. In general, the destinations 190 are specified via any number of unicast IP addresses 130 and/or multicast IP addresses 130, in any combination. The change over application 150 may cause portions of the distribution video content 180 to be transmitted to the destinations 190 in any technically feasible fashion.

For instance, in some embodiments, the computer instance 110 is implemented in a cloud computing environment that includes an orchestration layer. In such embodiments, the change over application 150 may perform mapping operations that configure the cloud computing environment to transmit portions of the origination video content 140 received from the distribution source 154 to the destinations 190. For example, the change over engine 150 could map a video input to the IP address 130 associated with the distribution source 154, and video outputs to the IP addresses 130 associated with the destinations 190. In other embodiments, the computer instance 110 could be implemented in processing functionality that is included in a switch or a router. In these types of embodiments, the change over application 150 could transmit the portions of the origination video content 140 received from the distribution source 154 to output ports of the switch or router corresponding to the destinations 190.

For explanatory purposes only, FIG. 1 depicts the system 100 at a particular point in time. As shown, the distribution source 154 is equal to the IP address 130(N) that is associated with the origination source 120(N). The origination source 120(N) provides the origination video data 140(N). Accordingly, the change over system 150 causes portions of the origination video data 140(N) to be transmitted to the destinations 190 as portions of the distribution video content 180. Notably, the change over system 150 operates continuously and, consequently, the distribution source 154 may vary over time. As a result, the quality of the distribution video content 180 is optimized on an on-going basis.

Note that the techniques described herein are illustrative rather than restrictive, and may be altered without departing from the broader spirit and scope of the invention. Many modifications and variations on the functionality provided by the change over application 150 will be apparent to those of ordinary skill in the art without departing from the scope and spirit of the described embodiments. For instance, in various embodiments, any number of the techniques may be implemented while other techniques may be omitted in any technically feasible fashion that configures a processor to execute a change over process based on IP addresses 130. Further, in some embodiments, the change over application 150 may implement additional functionality, such as video server functionality.

Optimizing Distribution Video Content

Figure 2:
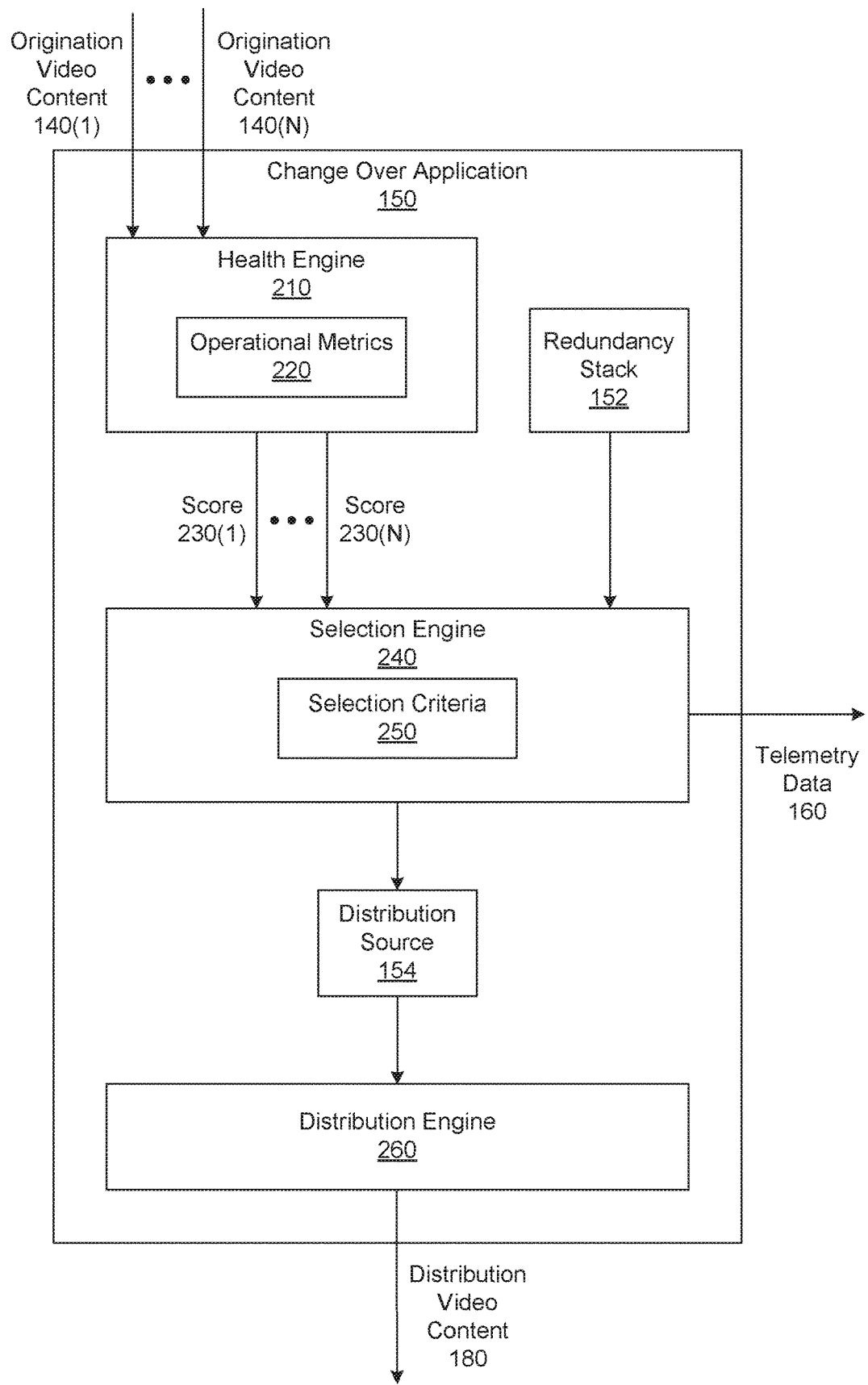
FIG. 2 is a more detailed illustration of the change over application of FIG. 1, according to various embodiments of the present invention.

FIG. 2 is a more detailed illustration of the change over application 150 of FIG. 1, according to various embodiments of the present invention. As shown, the change over application 150 includes, without limitation, a health engine 210, a selection engine 240, and a distribution engine 260.

Although not shown in FIG. 2, the change over application 150 may initialize the distribution source 154 in any technically feasible fashion. For instance, in some embodiments, the IP addresses 130 included in the redundancy stack 152 may be ordered from highest to lowest preference. In such embodiments, the change over application 150 may set the IP address 130 that specifies the distribution source 154 equal to the IP address 130 associated with the highest preference.

For each of the IP addresses 130(1)-130(N) included in the redundancy stack 152, the health engine 210 receives a portion the origination video content 140 from the associated origination source 120. The health engine 210 then computes a score 230 for each of the origination sources 120 based on corresponding portion of origination video content 140 and operational metrics 220. The operational metrics 220 may specify any number and type of measurements in any technically feasible fashion. For example, the operational metrics 220 could specify a single metric of error rate, a single metric of dropped packets, or a single metric that is a weighted aggregation of error rate and dropped packets. In another example, the operational metrics 220 could specify any number and combination of metrics that are associated with any quality characteristics or signal corruption characteristics. In general, for each of the origination sources 120, the health engine 210 computes any number of associated scores 230 based on the operational metrics 220, portion(s) of the origination video content 140, and any additional information in any technically feasible fashion.

In various embodiments, the operational metrics 220 are associated with a predetermined interval of time. In such embodiments, the health engine 210 or the change over application 150 is configured to buffer, delay, and/or store portions of the origination video content 140 for the predetermined interval of time. For instance, in some embodiments, the operational metric 220 may equal "error rate over two seconds," and the health engine 210 may store portions of the origination video content 140 for two seconds. For each of the origination sources 120, the health engine 210 may compute the score 230 based on the "current" portion of the associated origination video content 140 as well as portions of the associated origination video content 140 received during the two seconds prior to receiving the current portion.

In some embodiments, one or more of the operational metrics 220 specify measurements of differences and/or correlations between the different origination video content 140. For example, the operational metrics 220 could specify that any outliers across the portions of different origination video content 140 receive a value of zero for the score 230. In general, the health engine 210 may perform any number and type of operations (e.g., correlation operations, comparison operations, etc.) between any number and portions of different origination video content 140 received from different origination sources 120 to determine any number of the scores 230.

The selection engine 240 receives the scores 230 and determines the distribution source 154 based on the scores 230 and selection criteria 250. More specifically, the selection engine 240 sets the IP address 130 that specifies the distribution source 154 equal to the IP address 130 associated with one of the origination sources 120. In general, the selection engine 240 may determine the distribution source 154 in any technically feasible fashion based on any number of the scores 230, any number of the selection criteria 250, and any additional information. For instance, in some embodiments, the scores 230 may reflect error rates and the selection engine 240 may set the distribution source 154 equal to the origination source 120 that is associated with the lowest score 230.

In some alternate embodiments, the selection criteria 250 may specify a multi-step selection process based on the single "distribution" score 230 associated with the origination source 120 that is the distribution source 154, an acceptability threshold, and an ordering associated with the redundancy stack 152. To implement the selection criteria 250, the selection engine 240 may compare the distribution score 230 to the acceptability threshold to determine whether the distribution source 154 is acceptable. If the selection engine 240 determines that the distribution source 154 is not acceptable, then the selection engine 240 may set the distribution source 154 equal to the next origination source 120 based on the ordering of the IP addresses 130 included in the redundancy stack 152. In such embodiments, instead of computing scores 230 for each of the origination sources 120, the health engine 210 may be configured to compute the single score 230 that is associated with the distribution source 154.

As shown, the selection engine 240 also generates the telemetry data 160 and transmits the telemetry data 160 to the video provider 170. The telemetry data 160 may include any number and type of data. For example, the telemetry data 160 may include the IP address 130 associated with the distribution source 154, the IP address 130 associated with the previous distribution source 154, and the scores 230. Although not shown, in alternate embodiments, the selection engine 240 may implement any number of manual override mechanisms that enable the video provider 170 to select the IP address 130 of the distribution source 154 in any technically feasible fashion. For example, the change over application 150 may implement a GUI or an API that enables the video provider 170 to view the telemetry data 160 and manually specify a desired origination source 120 as the distribution source 154.

The distribution engine 260 receives the distribution source 154 and causes portions of the origination video content 140 received from the distribution source 154 to be transmitted to the destinations 190 as portions of the distribution video content 180. The distribution engine 260 may cause portions of the origination video content 140 received from the distribution source 154 to be transmitted to any number of the destinations 190 in any technically feasible fashion. For instance, in some embodiments, the distribution engine 260 itself may transmit portions of the origination video content 140 received from the distribution source 154 to the destinations 190 via one or more unicast or multicast IP addresses 130.

In some embodiments, the distribution engine 260 may configure any number of devices or applications to transmit portions of the origination video content 140 received from the distribution source 154 to the destinations 190. For instance, in some embodiments, the change over application 150 may be implemented as firmware included in a switch or router. In such embodiments, the distribution engine 260 may configure the switch or router to transmit portions of the origination video content 140 received from the distribution source 154 to output ports corresponding to the IP addresses 130 associated with the destinations 190.

In other embodiments, the change over application 150 may be implemented in a cloud computing environment. In such embodiments, the change over application 150 may perform mapping operations via an orchestration layer included in the cloud computing environment. The mapping operations may configure resources included in the cloud computing environment to transmit portions of the origination video content 140 received from the distribution source 154 to the destinations 190. For example, the distribution engine 260 could map an input to the IP address 130 associated with the distribution source 154 and corresponding outputs to any number and combination of unicast IP addresses 130 and multicast IP addresses 130 associated with the destinations 190. As persons skilled in the art will recognize, when the distribution source 154 does not change, the distribution engine 260 does not necessarily perform any configuration operations.

Notably, the portions of the origination video content 140 that are transmitted to the destinations 150 may or may not be equal to the "current" portion of the origination video content 140 as received by the health engine 210. For example, in some embodiments, the change over system 150 may not implement any buffering and/or delays, and the current portion of the origination video content 140 received from the distribution source 154 may be transmitted to the destinations. In other embodiments, the scores 230 reflect error rates over a predetermined amount of time (e.g., one second) proceeding the current portions of the origination video content 140. In such embodiments, to avoid transmitting any corrupted portions of the origination video content 140, the change over application 150 may implement internal buffering and/or delays based on the predetermined amount of time. The change over subsystem 150 may implement any type of buffering and/or delays in any technically feasible fashion.

As the health engine 210 receives new portions of the origination video content 140(1)-140(N), the health engine 210 computes new scores 230. The selection engine 240 then re-evaluates the scores 230 and re-determines the distribution source 154. Finally, the distribution engine 260 ensures that portions of origination video content 140 received from the distribution source 154 are relayed to the destinations 190 as portions of the distribution video content 180. In this fashion, the change over application 150 continuously optimizes the distribution video content 180.

In alternate embodiments, the memory 116 may not include the change over application 150, the health engine 210, the selection engine 240, and/or the distribution engine 260. Instead, the change over application 150, the health engine 210, the selection engine 240, and/or the distribution engine 260 may be provided as an application program (or programs) stored on computer readable media such as a CD-ROM, DVD-ROM, flash memory module, or other tangible storage media.

In various embodiments, the functionality of the change over application 150, the health engine 210, the selection engine 240, and/or the distribution engine 260 may be integrated into or distributed across any number (including one) of software applications. Further any number of the change over application 150, the health engine 210, the selection engine 240, and/or the distribution engine 260 may execute on any number of instruction execution systems or in any type of computing environment in any combination.

Figure 3:
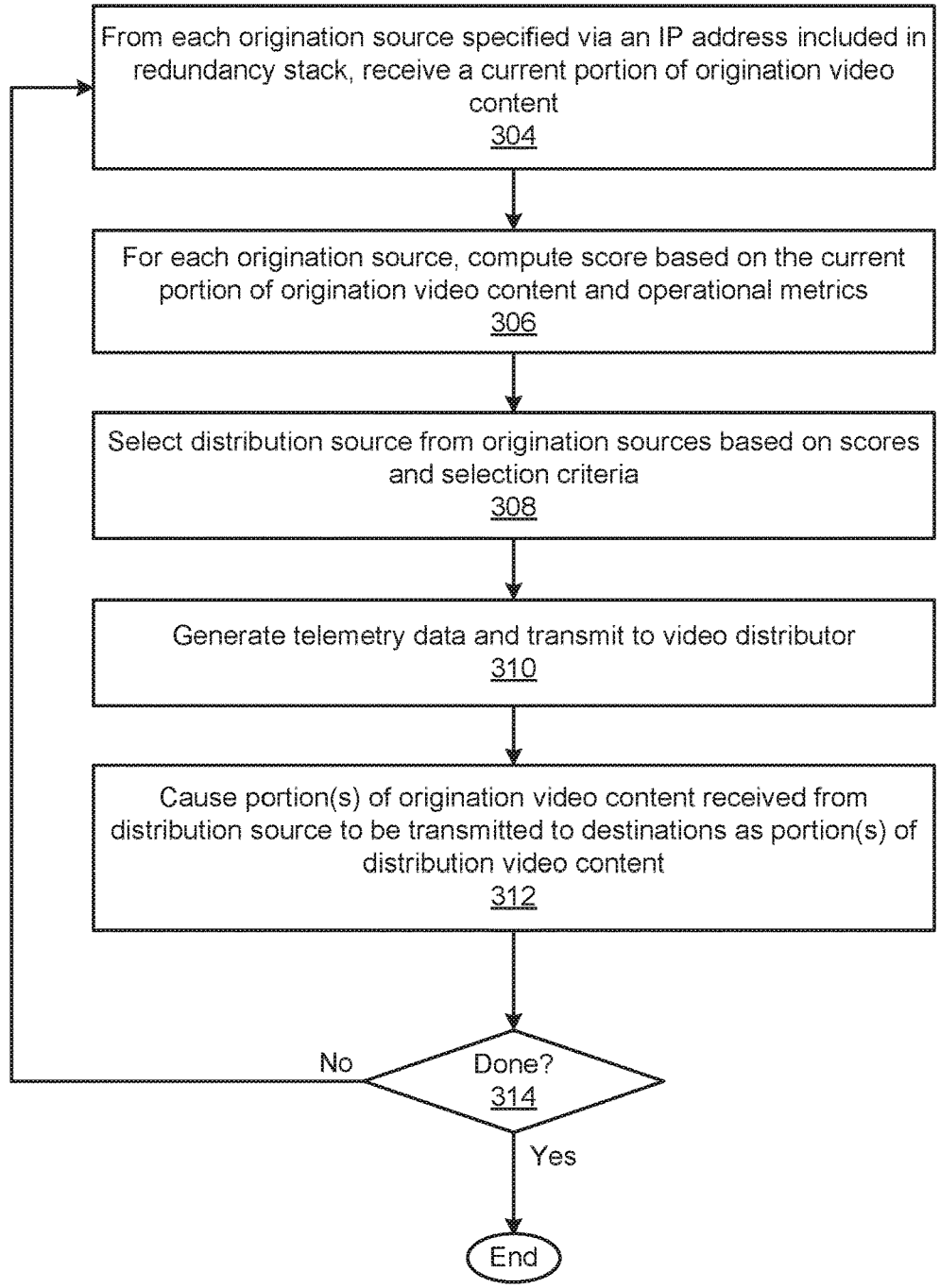
FIG. 3 is a flow diagram of method steps for managing the distribution of video content received from different origination sources, according to various embodiments of the present invention.

FIG. 3 is a flow diagram of method steps for managing the distribution of video content received from different origination sources. Although the method steps are described with reference to the systems of FIGS. 1-2, persons skilled in the art will understand that any system configured to implement the method steps, in any order, falls within the scope of the present invention.

As shown, a method 300 begins at step 304, where, from each of the origination sources 120(1)-120(N), the health engine 210 receives a current portion of the associated origination video content 140(1)-140(N). Notably, each of the origination sources 120(1)-120(N) is specified via a different one of the IP addresses 130(1)-130(N) included in the redundancy stack 152. As a general matter, the redundancy stack 152 specifies the IP addresses 130 associated with the origination sources 120 for ostensible (i.e., when no corruption is present) identical origination video content 140. The change over application 150 may determine the redundancy stack 152 in any technically feasible fashion. For example, the change over application 150 could include a GUI or an API that enables the video distributor 170 to specify the IP addresses 130 that define the redundancy stack 152.

At step 306, for each of the origination sources 120, the health engine 210 computes the associated score 230 based on the portion of the associated origination video content 140 and the operational metrics 220. In alternate embodiments, the health engine 210 may compute any number of scores 230 for any number of the origination sources 120 in any technically feasible fashion based on the any amount and type of information. For instance, in some embodiments, the health engine 210 may set each of the scores 230 equal to an error rate based on the portions of the associated origination video content 140 received during a predetermined interval of time.

At step 308, the selection engine 240 sets the distribution source 154 equal to one of the origination sources 120 based on the scores 230 and the selection criteria 250. More precisely, the selection engine 240 sets the IP address 130 that specifies the distribution source 154 equal to the IP address 130 associated with one of the origination sources 120. The selection engine 240 may select the distribution source 154 in any technically feasible fashion based on any number of the scores 230, any number of the selection criteria 250, and any additional information.

For instance, in some embodiments, the scores 230 may reflect error rates and the selection engine 240 may set the distribution source 154 equal to the origination source 120 that is associated with the lowest score 230. In alternate embodiments, the selection criteria 250 may specify a selection process based on the single "distribution" score 230 associated with the origination source 120 that is the distribution source 154 and a predetermined ordering of the origination sources 120. In such embodiments, step 306 of method 300 may be modified to compute one score 230.

At step 310, the selection engine 240 generates the telemetry data 160 and transmits the telemetry data 160 to the video provider 170. The telemetry data 160 may include any number and type of data in any technically feasible fashion. At step 312, the distribution engine 260 causes one or more portions of the origination video content 140 received from the distribution source 154 to be transmitted to the destinations 190 as portions(s) of the distribution video content 180. The distribution engine 260 may cause the portion(s) of the origination video content 140 to be transmitted to any number of the destinations 190 directly or indirectly in any technically feasible fashion.

For example, the distribution engine 260 could configure video server functionality included in the change over application 150 to deliver portion(s) of the origination video content 140 to the destination 190. In another example, the distribution engine 260 could configure an orchestration layer, a video server application, or components included in a switch to deliver portion(s) of the origination video content 140 to the destinations 190. As described previously herein, the portion(s) of the origination video content 140 that are transmitted may not necessarily include the current portion of the origination video content 140.

At step 314, the change over application 150 determines whether any new portions of the origination video content 140(1)-140(N) have been received from the origination sources 120(1)-120(N). If, at step 314, the change over application 150 determines that new portions of the origination video content 140 have been received, then the method 300 returns to step 304. The health engine 210 then computes new scores 230 based on the new portions of the origination video content 140(1)-140(N). If, however, at step 314, the change over application 150 determines that no new portions of the origination video content 140(1)-140(N) have been received, then the method 300 terminates.

In sum, the disclosed techniques may be implemented to perform a change over process that continually optimizes a distribution source of distribution video content based on multiple redundant sources of ostensibly identical origination video content. A change over application includes, without limitation, a redundancy stack, a health engine, a selection engine, and a destination router. The redundancy stack specifies multiple IP addresses, where each IP address specifies an origination source of origination video content. For each origination source, the health engine computes a score based on operational metrics and portion(s) of origination video content received from the origination source. The selection engine then compares the scores based on any number of selection criteria to select one of the origination sources as a distribution source. Finally, the destination router causes portions of the origination video content received from the distribution source to be transmitted to any number of destinations as portions of the distribution video content. Because the change over system operates continuously, the distribution source may vary over time.

Advantageously, the change over application may execute on any processor or device with processing capabilities. In particular, the change over application may execute within a device that also implements video server functionality or is co-located with a corresponding video server. Consequently, the change over application may select the optimal distribution source based on scores that accurately reflect the quality of portions of origination video content received at the corresponding video server irrespective of the physical location of the video server. By contrast, conventional approaches to performing a change over process typically require dedicated hardware e, change over boxes) that may be impossible to install in close proximity to a corresponding video server. A change over box that is physically separated from the corresponding video server may select a sub-optimal designated source based on scores that reflect the quality of portions of origination video content received at the change over box instead of the video server. In addition, as the distance between the video server and the change over box increases, the resource demands required to maintain the transmission paths between the video server and the change over box increase.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for distributing video content received from multiple origination sources, the method comprising:
   receiving, at a first machine, a plurality of portions of first origination video content transmitted by a plurality of origination source devices, wherein the plurality of portions includes a first portion transmitted by a first origination source device that is associated with a first internet protocol (IP) address;
   for each origination source device included in the plurality of origination source devices, measuring, by the first machine, one or more operational metrics associated with the origination source device based on a portion of the first origination video content received from the origination source device;
   for each origination source device included in the plurality of origination source devices, computing, by the first machine, a score for the origination source device based on the one or more operational metrics measured for the origination source device, wherein a first score is computed for the first origination source device based on one or more operational metrics measured for the first origination source device;
   identifying, by the first machine and based on the first score and a selection criterion, a second origination source device included in the plurality of origination source devices that transmits second origination video content, wherein the second origination source device is associated with a second IP address; and
   based on identifying the second origination source device, transmitting by the first machine, or configuring a device associated with the first machine to transmit, a portion of the second origination video content to a first destination as a portion of distribution video content, wherein the portion of the second origination video content has been transmitted by and received from the second origination source device.

2. The computer-implemented method of claim 1, wherein a signal protocol associated with the first origination video content comprises baseband video or IP streaming video.

3. The computer-implemented method of claim 1, further comprising generating telemetry data based on the first score for the first origination source device, and transmitting the telemetry data to a second destination.

4. The computer-implemented method of claim 1, wherein the first score is computed for the first origination source device based on an error rate or a number of dropped packets associated with the first portion of the first origination video content received from the first origination source device by the first machine.

5. The computer-implemented method of claim 1, wherein the selection criterion comprises an ordering of a plurality of origination IP addresses that includes the first IP address and the second IP address, and identifying the second origination source device comprises:
   determining that the first score for the first origination source device is not acceptable based on an acceptability threshold; and
   selecting a next IP address included in the plurality of origination IP addresses based on the ordering.

6. The computer-implemented method of claim 1, further comprising:
   computing a second score based on the portion of the second origination video content received from the second origination source device;
   determining that the second score is acceptable based on an acceptability threshold; and
   causing a subsequent portion of the second origination video content received from the second origination source device to be transmitted to the first destination as a subsequent portion of the distribution video content.

7. The computer-implemented method of claim 1, wherein identifying the second origination source device comprises:
   performing one or more comparison operations between a plurality of scores that includes the first score for the first origination source device to determine an optimal score based on the selection criterion, wherein each score included in the plurality of scores is associated with a different IP address included in a plurality of origination IP addresses; and
   selecting an IP address associated with the optimal score.

8. The computer-implemented method of claim 1, wherein the first score is computed for the first origination source device based on at least one other operational metric that is measured for the first origination source device and is based on another portion a plurality of portions of the first origination video content received from the first origination source device.

9. The computer-implemented method of claim 1, wherein the first portion of the first origination video content is received via a live satellite feed.

10. One or more non-transitory computer-readable storage media including instructions that, when executed by one or more processors residing in a first machine, configure the one or more processors to perform the steps of:
    receiving, at the first machine, a plurality of portions of first origination video content transmitted by a plurality of origination source devices, wherein the plurality of portions includes a first portion transmitted by a first origination source device that is associated with a first internet protocol (IP) address;

for each origination source device included in the plurality of origination source devices, measuring, by the first machine, one or more operational metrics associated with the origination source device based on a portion of the first origination video content received from the origination source device;

for each origination source device included in the plurality of origination source devices, computing, by the first machine, a score for the origination source device based on the one or more operational metrics measured for the origination source device, wherein a first score is computed for the first origination source device based on one or more operational metrics measured for the first origination source device;

identifying, by the first machine and based on the first score and a selection criterion, a second origination source device included in the plurality of origination source devices that transmits second origination video content, wherein the second origination source device is associated with a second IP address; and based on identifying the second origination source device, transmitting by the first machine, or configuring a device associated with the first machine to transmit, a portion of the second origination video content to a first destination as a portion of distribution video content, wherein the portion of the second origination video content has been transmitted by and received from the second origination source device.

11. The one or more non-transitory computer-readable storage media of claim 10, wherein the first score is computed for the first origination source device based on an error rate or a number of dropped packets associated with the first portion of the first origination video content received from the first origination source device by the first machine.

12. The one or more non-transitory computer-readable storage media of claim 10, wherein the selection criterion comprises an ordering of a plurality of origination IP addresses that includes the first IP address and the second IP address, and identifying the second origination source device comprises:
determining that the first score for the first origination source device is not acceptable based on an acceptability threshold; and
selecting a next IP address included in the plurality of origination IP addresses based on the ordering.

13. The one or more non-transitory computer-readable storage media of claim 10, wherein identifying the second origination source device comprises:
performing one or more comparison operations between a plurality of scores that includes the first score for the first origination source device to determine an optimal score based on the selection criterion, wherein each score included in the plurality of scores is associated with a different IP address included in a plurality of origination IP addresses; and
selecting an IP address associated with the optimal score.

14. The one or more non-transitory computer-readable storage media of claim 10, wherein the first score is computed for the first origination source device based on at least one other operational metric that is measured for the first origination source device and is based on another portion of the first origination video content received from the first origination source device.

15. The one or more non-transitory computer-readable storage media of claim 14, wherein the another portion of the first origination video content is associated with a predetermined interval of time.

16. The one or more non-transitory computer-readable storage media of claim 10, wherein a first time associated with the first portion of the first origination video content is subsequent to a second time associated with the portion of the second origination video content.

17. The one or more non-transitory computer-readable storage media of claim 10, wherein the first destination is associated with a unicast IP address or a multicast IP address.

18. The one or more non-transitory computer-readable storage media of claim 10, wherein the first origination video content, the second origination video content, and the distribution video content are all associated with a single title.

19. A system comprising:
one or more memories storing a changeover application; and
one or more processors that are coupled to the one or more memories and reside in a first machine, wherein, when executed by the one or more processors, the changeover application configures the one or more processors to:
receive, at the first machine, a plurality of portions of first origination video content transmitted by a plurality of origination source devices, wherein the plurality of portions includes a first portion transmitted by a first origination source device that is associated with a first internet protocol (IP) address;
for each origination source device included in the plurality of origination source devices, measure, by the first machine, one or more operational metrics associated with the origination source device based on a portion of the first origination video content received from the origination source device;
for each origination source device included in the plurality of origination source devices, compute, by the first machine, a score for the origination source device based on the one or more operational metrics measured for the origination source device, wherein a first score is computed for the first origination source device based on one or more operational metrics measured for the first origination source device;
identify, by the first machine and based on the first score and a selection criterion, a second origination source device included in the plurality of origination source devices that transmits second origination video content, wherein the second origination source device is associated with a second IP address; and
based on identifying the second origination source device, transmit by the first machine, or configure a device associated with the first machine to transmit, a portion of the second origination video content to a first destination as a portion of distribution video content, wherein the portion of the second origination video content has been transmitted by and received from the second origination source device.

20. The system of claim 19, wherein the first machine is in a cloud data center, a router, or a switch.

* * * * *

UNITED STATES PATENT AND TRADEMARK OFFICE
CERTIFICATE OF CORRECTION

PATENT NO. : 10,791,378 B2  
APPLICATION NO. : 15/494404  
DATED : September 29, 2020  
INVENTOR(S) : Michael Strein, Efthimis Stefanidis and Vladislav Feldman Page 1 of 1

It is certified that error appears in the above-identified patent and that said Letters Patent is hereby corrected as shown below:

In the Claims

Column 14, Claim 8, Line 54, please delete "a plurality of portions".

Signed and Sealed this  
Seventeenth Day of November, 2020

Andrei Iancu  
*Director of the United States Patent and Trademark Office*